May 31, 1932. W. W. MUIR 1,860,783
RADIATOR SUPPORT
Filed Jan. 26, 1929 7 Sheets-Sheet 2
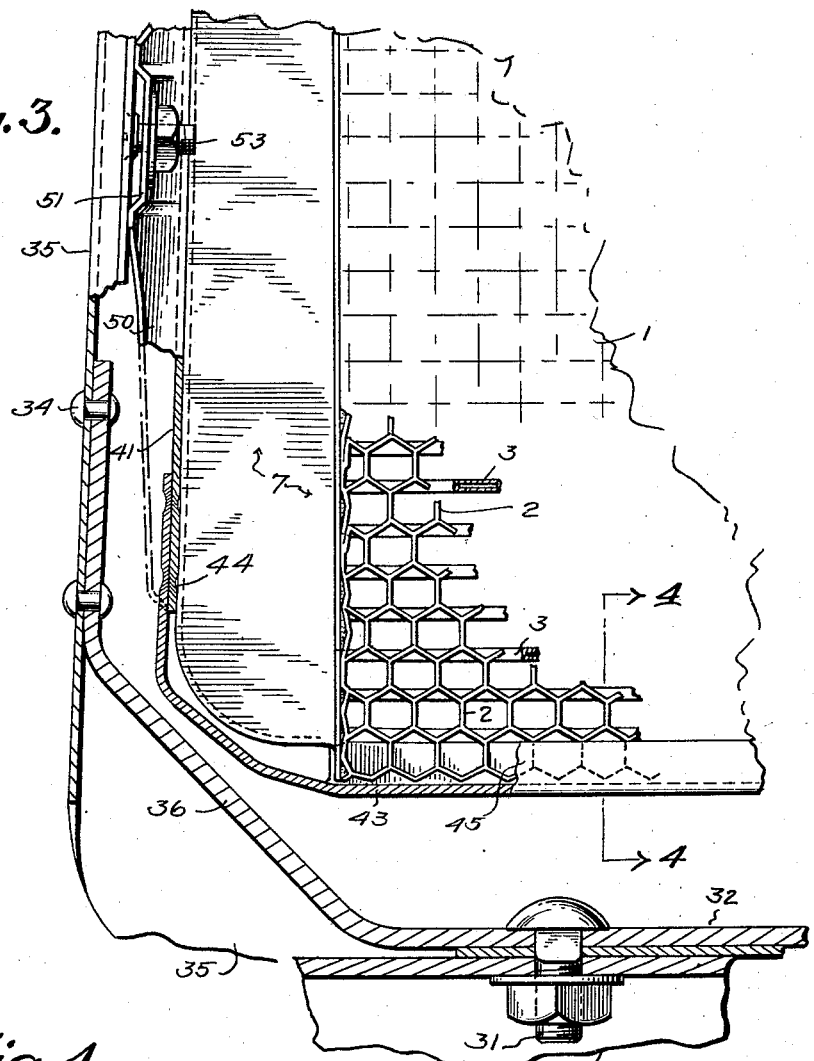
Fig.3.
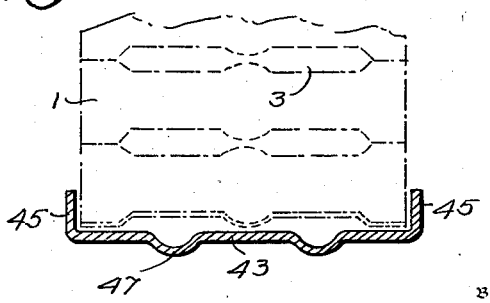
Fig.4.
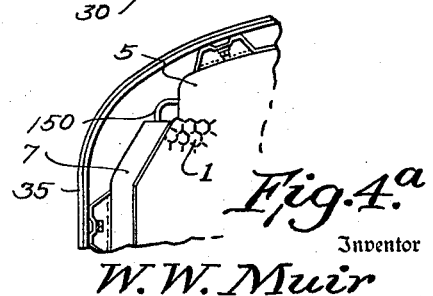
Fig.4.ª
Inventor
W. W. Muir
By
Attorney May 31, 1932.  W. W. MUIR  1,860,783
RADIATOR SUPPORT
Filed Jan. 26, 1929  7 Sheets-Sheet 3

W. W. Muir, Inventor

Attorney

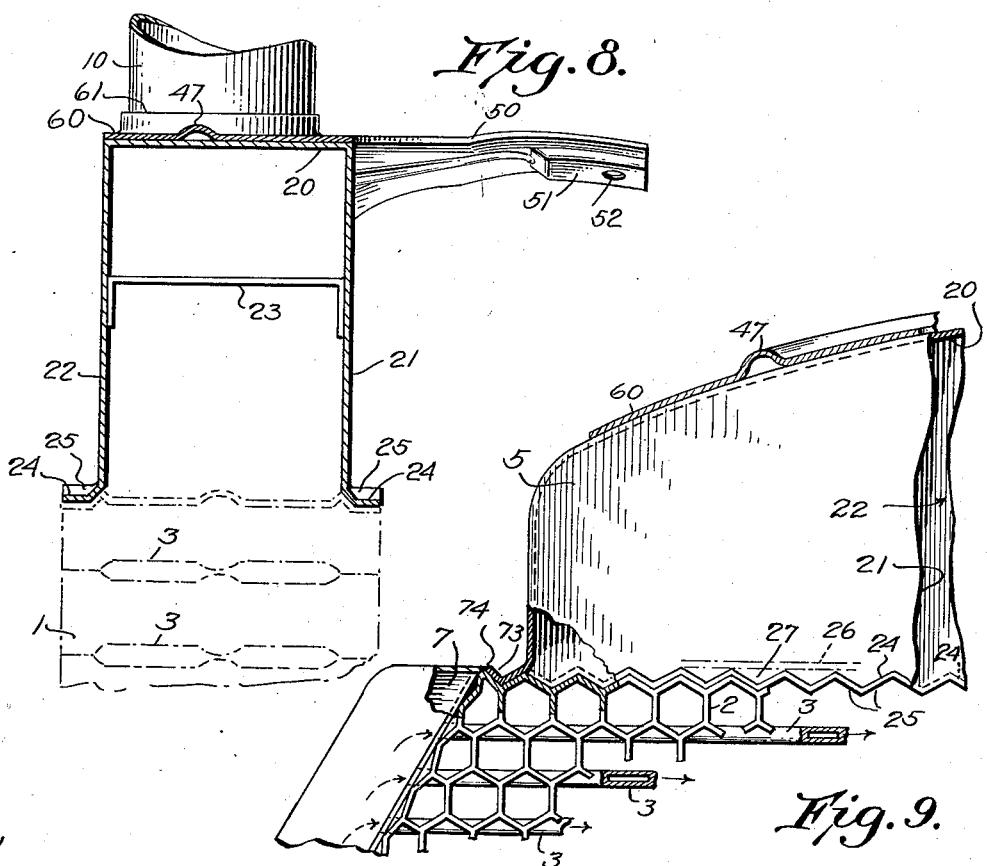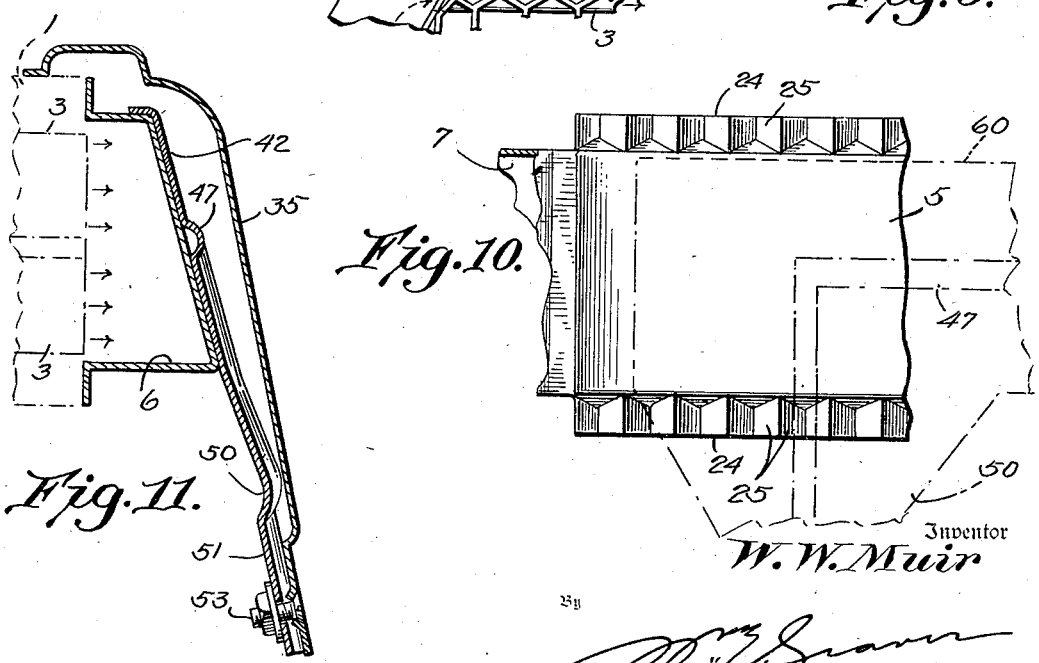

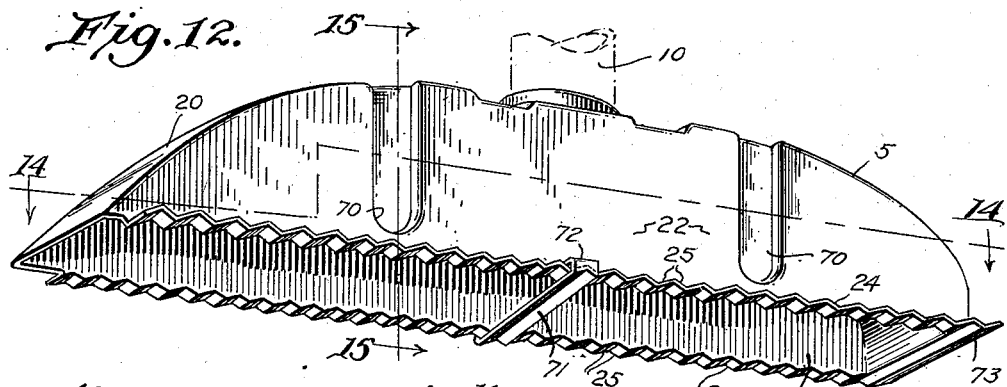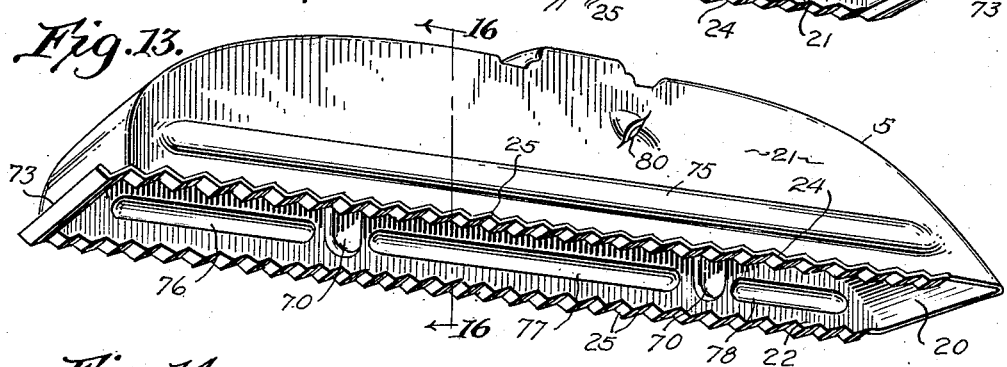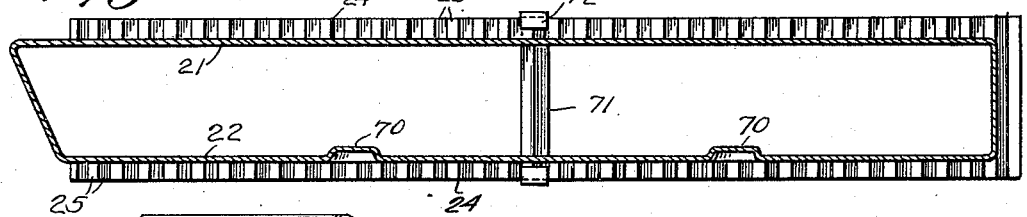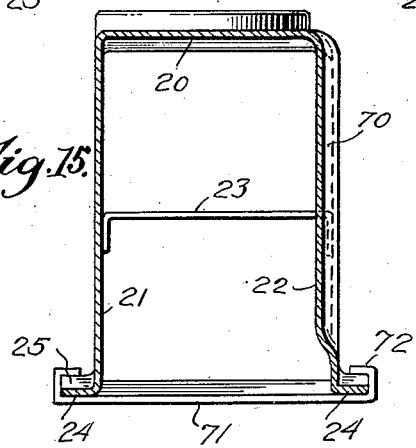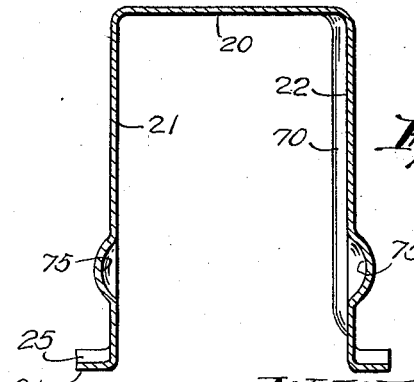

May 31, 1932.  W. W. MUIR  1,860,783
RADIATOR SUPPORT
Filed Jan. 26, 1929    7 Sheets-Sheet 6
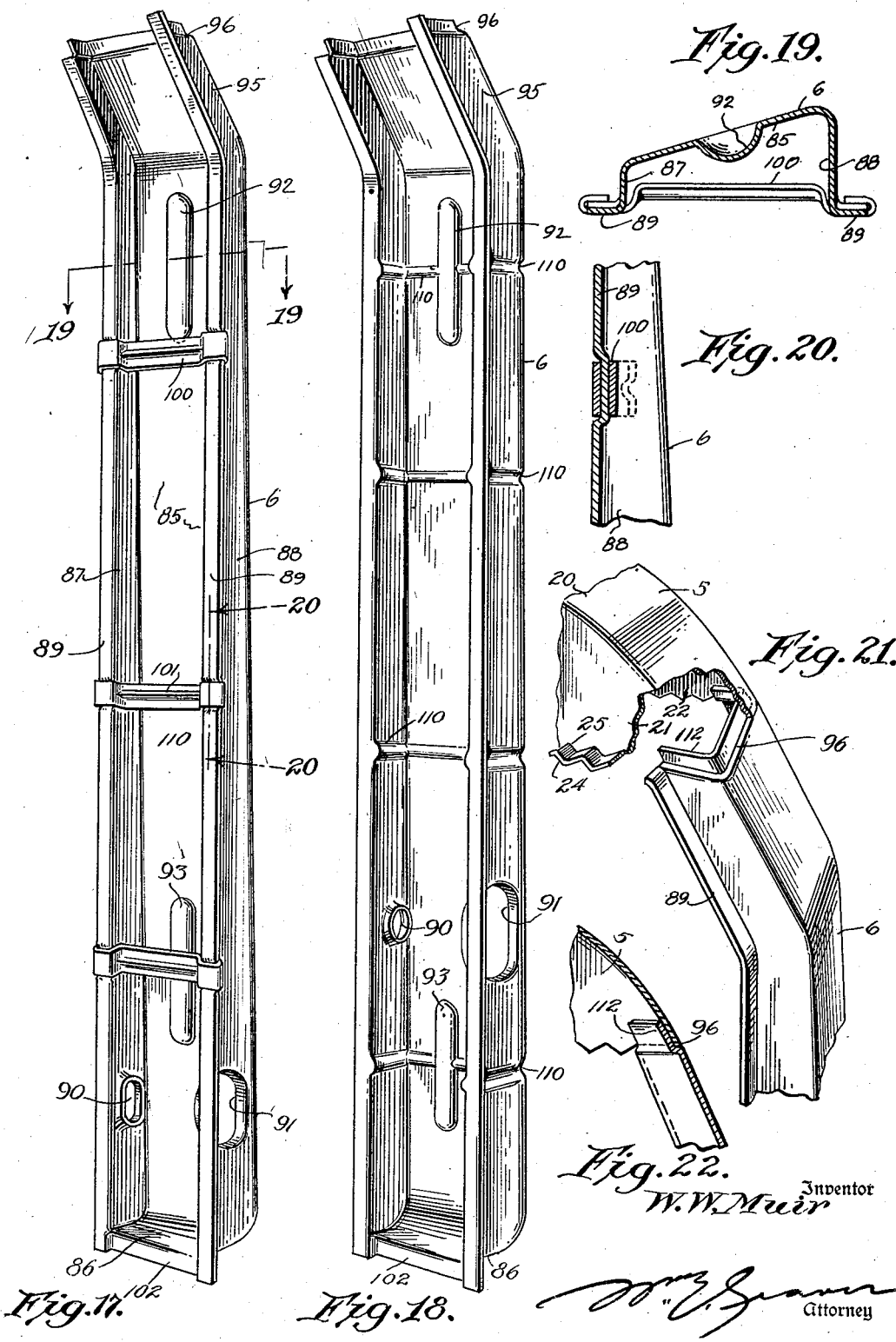

May 31, 1932.    W. W. MUIR    1,860,783
RADIATOR SUPPORT
Filed Jan. 26, 1929    7 Sheets-Sheet 7
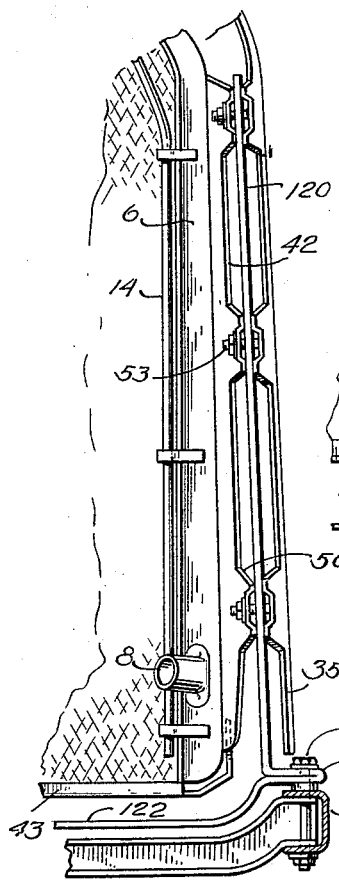
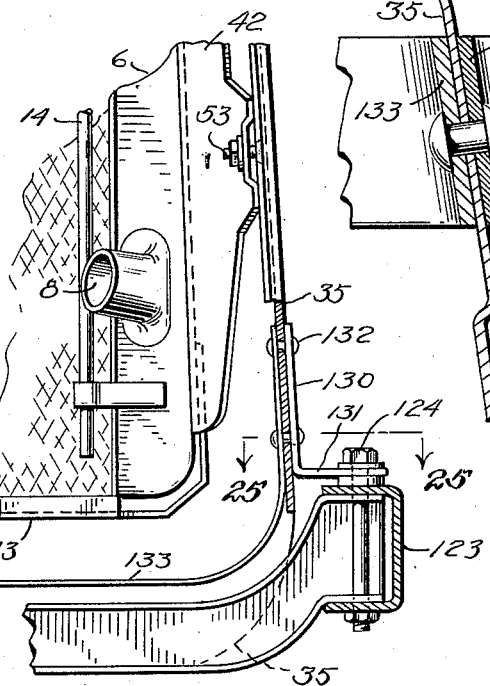
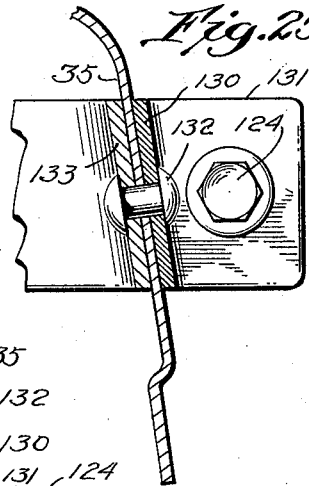
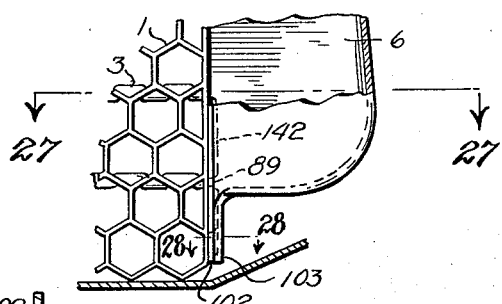
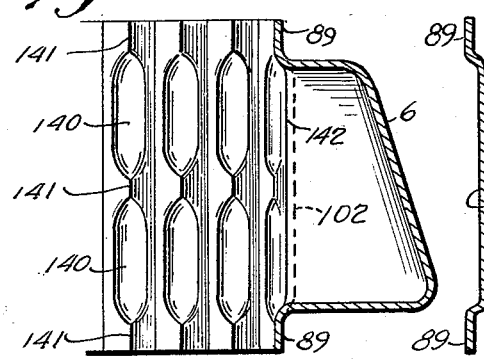
Inventor
W. W. Muir
By
Attorney Patented May 31, 1932

1,860,783

UNITED STATES PATENT OFFICE

WELLINGTON W. MUIR, OF LOCKPORT, NEW YORK, ASSIGNOR TO HARRISON RADIATOR CORPORATION, OF LOCKPORT, NEW YORK, A CORPORATION OF NEW YORK

RADIATOR SUPPORT

Application filed January 26, 1929. Serial No. 335,224.

This invention relates to radiators and suspensions therefor, having for its object to provide a new and novel construction which will be less costly to manufacture and more efficient in use than those heretofore proposed.

With these and other objects in view the invention consists in the novel details of construction and combinations of parts as will be more fully hereinafter disclosed and particularly pointed out in the claims.

Referring to the accompanying drawings forming a part of this specification in which like numerals designate like parts in all the views,—

Fig. 3 is an enlarged detail view illustrating the construction as employed in this invention;

Fig. 4 is a vertical sectional view taken as on the line 4—4 of Fig. 3 and looking in the direction of the arrows;

Fig. 4a is a partial detail view illustrating a modification of construction relative to the inlet and top tanks;

Fig. 8 is an enlarged vertical sectional view taken transversely of the radiator illustrating the top tank construction and top anchoring member;

Fig. 9 is an enlarged detail view of a portion of the radiator illustrating the construction employed with particular reference to the method of joining the top tank and one of the side tanks to the radiator core;

Fig. 10 is a top plan view of the parts shown in Fig. 9 to further illustrate the method of joining the top tank to the radiator core;

Fig. 11 is a horizontal sectional view taken as on the line 11—11 of Fig. 1 and looking in the direction of the arrows;

Fig. 12 is a perspective view of the top tank before it is applied to the rest of the radiator assembly;

Fig. 13 is a perspective view of a modified form of the top tank before it is applied to the rest of the radiator assembly;

Fig. 14 is a longitudinal sectional view of the top tank taken as on the line 14—14 of Fig. 12 and looking in the direction of the arrows;

Fig. 15 is a transverse sectional view of the top tank taken as on the line 15—15 of Fig. 12 and looking in the direction of the arrows;

Fig. 16 is a transverse sectional view of the modified form of top tank illustrated in Fig. 13 and taken as on the line 16—16 thereof, looking in the direction of the arrows;

Fig. 17 is a perspective view of the side tank 6 before it is applied to the rest of the radiator assembly;

Fig. 18 is a perspective view of a modified form of the side tank 6 before it is applied to the rest of the radiator assembly;

Fig. 19 is a transverse sectional view of the side tank 6 taken as on the line 19—19 of Fig. 17 and looking in the direction of the arrows;

Fig. 20 is a partial sectional view of the side tank 6 taken as on the line 20—20 of Fig. 17 and looking in the direction of the arrows;

Fig. 21 is a perspective detail view with a portion broken away illustrating the joint between the tanks 5 and 6;

Fig. 22 is a vertical sectional view through the joint disclosed in Fig. 21;

Fig. 23 is a partial view, similar to Fig. 1, illustrating the radiator supported by the side framing members of the chassis;

Fig. 24 is a view, similar to Fig. 23, illustrating a modification of the side frame support of the radiator;

Fig. 25 is a sectional view taken as on the line 25—25 of Fig. 24 and looking in the direction of the arrows;

Fig. 26 is a fragmentary view partly in section illustrating the joint between the core of the radiator and the bottom of the side tank 6;

Figure 1:
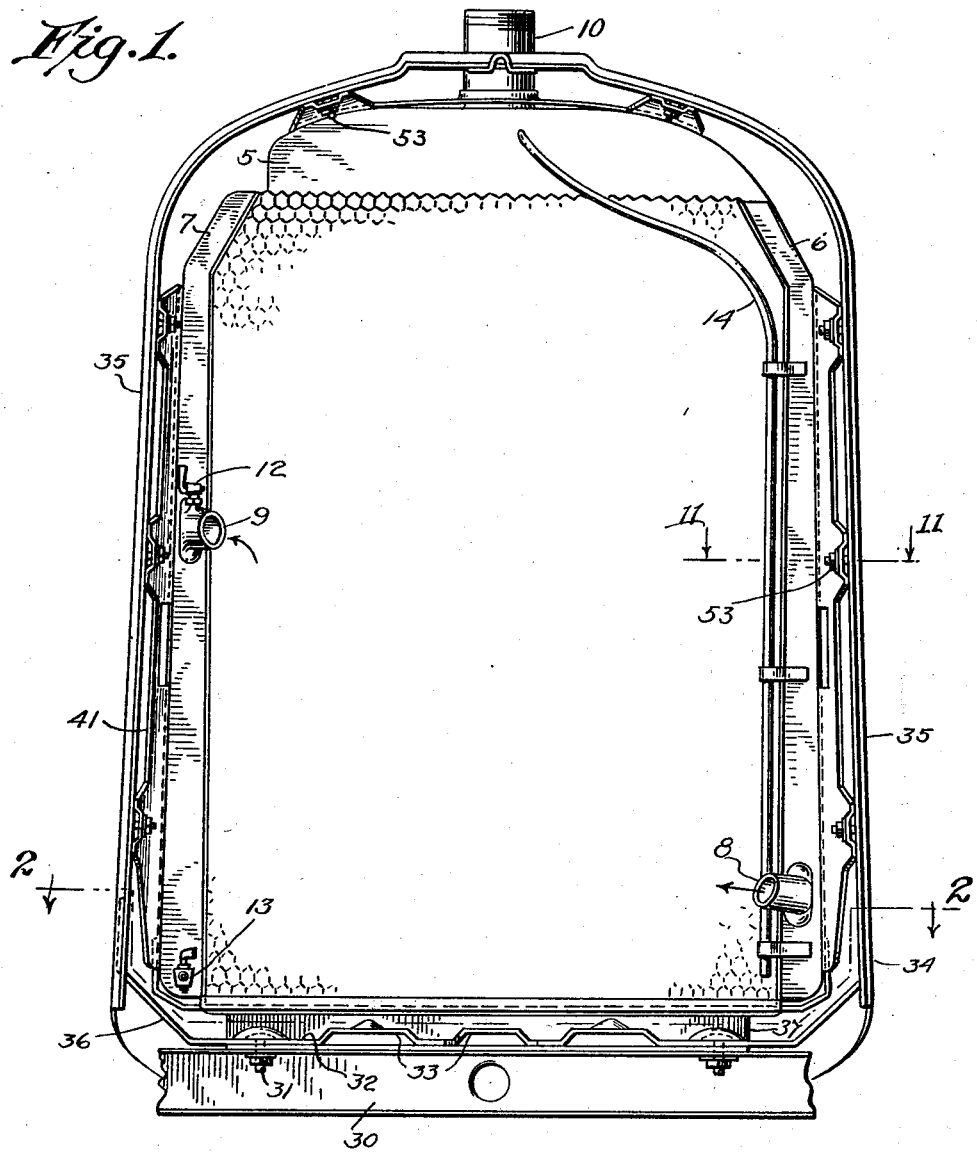
Fig. 1 is an elevational view of the rear of a completely assembled and suspended radiator.
Figure 2:
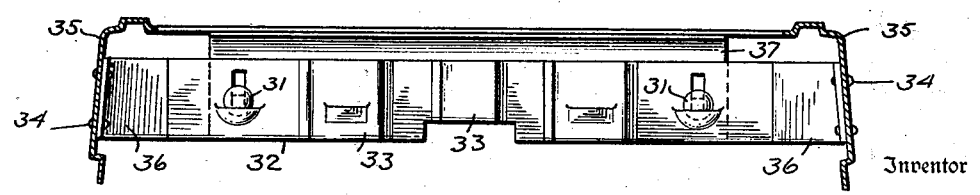
Fig. 2 is a horizontal sectional view of some of the parts shown in Fig. 1 taken as on the line 2—2 of said figure and looking in the direction of the arrows.

Fig. 27 is a horizontal sectional view of the parts shown in Fig. 26 and taken as on the line 27—27 thereof looking in the direction of the arrows; and Fig. 28 is a horizontal sectional view of the bottom flange of the tank 6 taken as on the line 28—28 of Fig. 26 and looking in the direction of the arrows;

In order that this invention may be the better understood it is said that in heretofore known types of radiator construction, assembling, and securement to the automobile, the use of solder has been resorted to, but due to the honey-comb construction of the radiator core, the use of said solder has often been detrimental, in that it has clogged or otherwise closed some of the ends of the passages for the cooling fluid which the radiator is adapted to receive. Also, with the honey-comb type of core, it has been extremely difficult to make a soldered joint which would be leak-proof. Lastly, heretofore known types of radiator have been attached to the automobile in such manner that the vibrations from the engine, and jolts transmitted through the car parts by inequalities in road surfaces, have been so severe as to cause the radiator to leak when seams and joints thereof have been loosened by said vibrations.

In fact some radiators have been so attached to the automobile that they are a rigid part of the machine, with the result that when the machine has been subjected for a while to road travel, the radiator has become warped and otherwise distorted in shape so that leaks will occur. It is the purpose of this invention to provide a radiator construction which will withstand the vibrations and jolts to which an automobile is subjected and to so support the radiator that it will not be substantially affected by said vibrations and jolts.

The radiator core 1 comprises the well known honeycomb construction by which a large percentage of air is permitted to pass through as the machine moves. In said honey-comb, which is made up of a great plurality of very thin brass sheets 2, there are provided a plurality of horizontal, spaced, fluid-conducting passages 3 which are formed by the assembling of the brass sheets, although said passages may comprise separate conduits if desired. The main purpose of this construction is to provide a large amount of heat radiating surface which is accomplished by the sheets 2 constituting radiating fins with respect to the fluid conducting passages 3.

Surrounding the core 1 on three sides thereof are tanks, the top tank 5 being in open communication at one end with the side tank 6 which extends to the bottom of the core. The other side tank 7 likewise extends from the top to the bottom of the core, but does not communicate in any way with the top tank 5. Near the bottom of the side tank 6 is disposed an outlet 8, and substantially half-way up the other side tank 7 there is disposed an inlet 9 whereby the cooling fluid from the engine may enter the side tank 7, pass through the conduits 3 and leave the opposite side tank 6 through the outlet 8, a suitable pump or other means being provided for positively circulating the cooling fluid, all as will be readily understood. In other words, the cooled fluid from the radiator tank 6 will be drawn through the outlet 8 through a suitable conduit by the action of a pump and forced through another conduit to the engine jacket where said fluid will absorb the heat from the cylinders of the engine. The heated fluid will then be forced by the circulatory means through a suitable conduit to the inlet 9 whereby it may enter the side tank 7 and reach the passages 3 which are in open communication at their ends with both side tanks 6 and 7.

The system is filled with the cooling liquid through the filler neck 10, disposed in the upper portion of the top tank 5, said liquid flowing from said tank into the side tank 6 for distribution throughout the system. The inlet 9 is provided with a cock 12 so that the level of the liquid utilized as a cooling medium may be governed in the system, and a second cock 13 is provided at the lowermost portion of the side tank 7 by means of which the radiator may be drained of liquid should occasion demand. A vent pipe 14, open at its bottom, is in open communication with the uper tank 5 to prevent undue pressure and air from accumulating in the system, and a suitable cover for the filler neck 10, not shown, is provided as usual.

From the foregoing it will thus be seen that with the system filled with liquid to the level of the cock 12 and the automobile in operation, the liquid will be heated and forced to circulate from the jacket to the radiator, and from the radiator back to the jacket. As the heated liquid passes through the core 1 of the radiator it will be cooled by the passages of air through the honey-comb construction before it is returned to the engine jacket. Should the temperature of said liquid be raised to a degree at which vapors will be evolved therefrom, the vapors as well as the liquid will pass from the engine jacket into the side tank 7 above the level of the liquid therein. Since the side tank 7 is closed at its upper end, said vapors will escape therefrom by entering the cooling conduits 3 in which they will be condensed, the condensate flowing into either tank 6 or tank 7 to join the circulating liquid of the system.

The radiator is made of sufficient size to take care of a large evolution of vapor and hence it is only under extreme conditions that said vapors will not be condensed by the time they reach the side tank 6. If, however, vapors do reach said tank they will rise and enter the top tank 5 where they may be condensed by the substantially large surface contact with the walls of said tank. If this is not sufficient to condense the vapors, then the vapors will pass from the system out through the vent 14, in which case they will be lost from the system to the atmosphere.

It has been found from tests that heretofore known radiators are subjected to the greatest strains at the uppermost portion thereof, since said portion is farthest away from the chassis of the automobile which constituted their support. Therefore the joint between the upper tank and the core has been given special consideration, with the result that the joint now to be disclosed has been found more efficient than prior constructions. The upper tank 5 comprises a top wall 20, provided with a suitable aperture in registry with the filler neck 10, and parallel side walls 21 and 22 braced as by a member 23. The lowermost edge of each side wall is outwardly flared as indicated at 24 and crimped as indicated at 25, see Figs. 8 and 9. The crimping 25 is of the same contour and dimensions as the formation of the honey-comb sheets 2 of the core. In other words, the honey-comb of this particular radiator is formed with hexagonal air passages as shown, and the crimping 25 is made of a degree to exactly fit the upper portions of the closed hexagons of said core. In Fig. 9 the dot and dash lines 26 indicate the outwardly flared bottom edge of a side wall of the upper tank of the usual type of construction, for the purpose of illustrating the necessity, heretofore, of a large amount of solder to fill the triangular spaces 27 between the closed hexagons of the core and said outwardly flared edge 26. It often resulted, when assembling a heretofore known type of radiator, that said triangular spaces 27 were not filled with solder and therefore the upper tank was only secured to the honey-comb core at the points where the outwardly flared edge 26 contacted with the apices of the hexagons thus resulting in a very insecure joint. By the construction here employed the outwardly flared end crimped edge presents a greater contact surface between the wall of the upper tank and the honey-comb core construction, and therefore an infinitely stronger joint will result. The strains and vibrations transmitted to a joint as made by this invention will be transmitted to and absorbed by the relatively thin sheet material 2 out of which the core is manufactured, and because said material is paper-thin, there will be a cushioning of spring-like absorption of said vibration.

The means of supporting the radiator in place on the automobile will now be disclosed. 30 represents the front structural member of the chassis to which is secured, as by the bolts 31, a U-shaped frame member 32 having reinforcing ribs 33 therein. The uprights of this member 32 have riveted or otherwise secured thereto as at 34 the outer ornamental shell 35 which covers the radiator proper. Thus it will be seen that the ornamental shell is directly secured to the chassis, but slight "give" or play is permitted due to the angular corners 36 of the U-frame 32. In other words, the ornamental shell is not rigidly secured to the chassis but is indirectly secured thereto through the U-frame so that strains will be partially absorbed by said U-frame instead of passing directly into the shell. A spacing plate 37 may be provided between the chassis 30 and said U-frame if desired to prevent any rattle between the shell 35 and said chassis.

Figure 5:
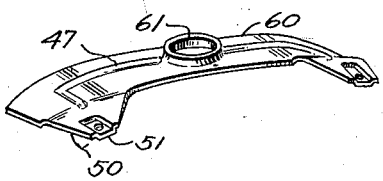
Fig. 5 is a perspective view of the top anchoring member associated with the radiator proper.
Figure 6:
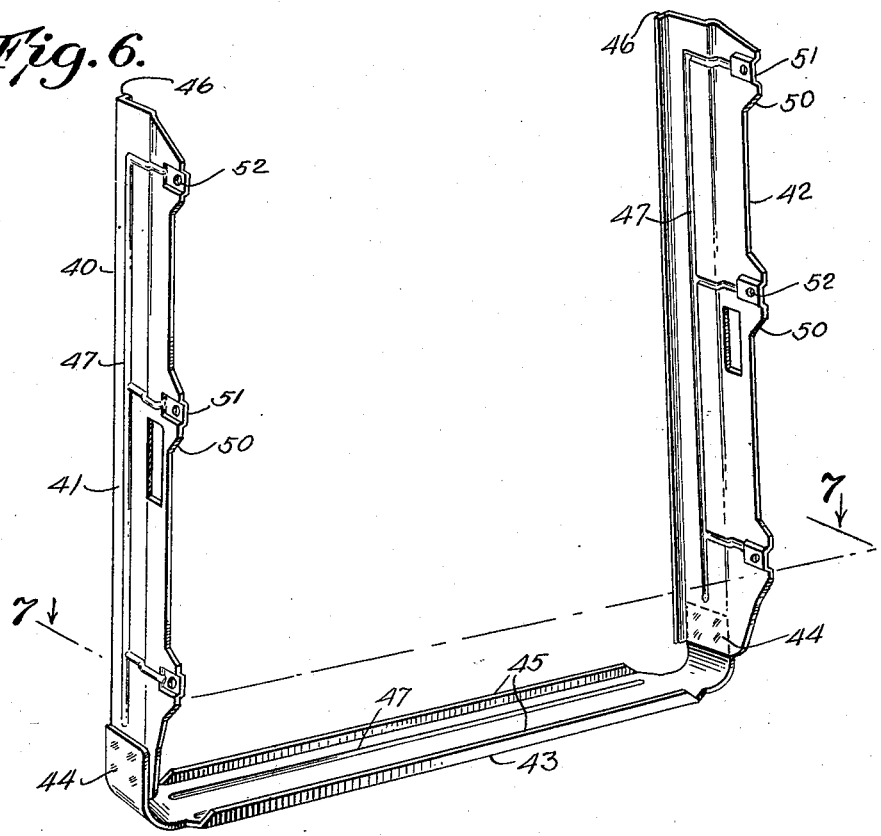
Fig. 6 is a perspective view of the sling adapted to support the radiator from the outer ornamental shell thereof.
Figure 7:
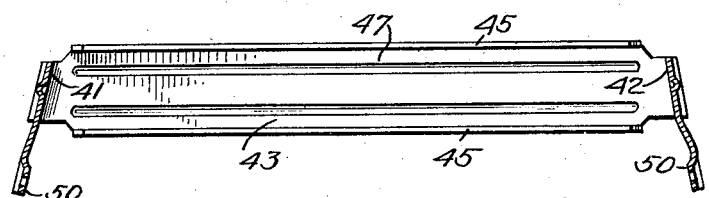
Fig. 7 is a horizontal sectional view taken as on the line 7—7 of Fig. 6 and looking in the direction of the arrows.

With particular reference to Figs. 5, 6 and 7 it will be observed that the radiator is adapted to be secured to the ornamental shell by a sling generally indicated by the numeral 40. This sling comprises a side member 41 adapted to be soldered, spot-welded or otherwise imperforately secured to the side tank 7 of the radiator. To the other side tank 6 is likewise secured a member 42 exactly similar to its companion member 41, and the lower ends of these two members are connected by a bridge 43 preferably spot-welded as indicated at 44 to said members. The result of this construction is a U-shaped sling for supporting the radiator. The side edges of the bridge 43 are upturned as indicated at 45 to provide a trough-like construction into which the radiator closely fits, the up-turned edges constituting flanges for preventing longitudinal movement of radiator core relative to the chassis. One edge of each of the members 41 and 42 are likewise flanged as indicated at 46 to further aid in positioning the radiator within the sling 40. Suitable strengthening ribs 47 are provided in the members 41, 42 and 43 as will be readily observed from the figures.

Each of the side members of the sling have extending portions 50 each crimped or recessed as indicated at 51 and each recess apertured as at 52 to receive bolts 53 by means of which the ornamental shell 35 is secured to the sling. Thus it will be seen that the radiator is supported in a sling carried by the ornamental shell which is in turn supported by the U-frame 32 carried by the chassis of the automobile. Each extension 50 of the side members of the sling is angularly formed as clearly seen in Fig. 7 so that the radiator proper is permitted to have a yielding support. That is to say, the vibrations from the chassis 30 can only reach the radiator after passing through at least three intervening members namely, the U-frame 36, the shell 35, and an extension 50 of the side members of the sling 40 each of which will absorb a substantial percentage thereof.

To additionally anchor the radiator to the ornamental shell there is provided the member 60 having the aperture 61, to fit the filler neck 10, and curved to fit the surface of the top wall 20 of the upper tank 5. This member 60 is likewise soldered, spot-welded or otherwise imperforately secured to said tank and provided with strengthening ribs 47, and extension 50 having recesses 51 all similar to the corresponding parts of the members of the sling 40. In other words the member 60 is adapted to be secured by the bolts 53 to the ornamental shell 35, the members 50 being angularly bent as were the extensions 50 of the sling to hold the radiator in spaced relation with respect to the sides of the shell 35. It has been found unnecessary to provide this member 60 as the side members 41 and 42 of the sling are adequate for securing the radiator within the shell. The size and weight of the radiator core and tank will control the necessity of this additional anchor member 60.

In Fig. 12 is disclosed a perspective view looking upward of a top tank 5 which is a modification of the top tank illustrated in Fig. 1, only differing therefrom in the front wall 22 thereof which is provided with one or more vertically disposed depressions constituting reinforcing ribs to prevent the top tank from collapse during the assembly of the entire radiator. Such a depression is shown at 70 as extending from the top wall 20 of the tank to a point short of the outwardly extending flange 24 at the bottom, the lowermost extremity of said depression being of substantially circular formation whereby the relatively thin material of the tank will not be piercingly damaged in the pressing formation. Fig. 15 more clearly shows the extent of the depression 70. The same bracing member 23 may be employed within the tank 5 to additionally support the walls 21 and 22 in spaced relation.

It has been found, due to the extreme thinness of the sheet material from which the tank is made, that said tank is apt to spread when it is assembled under pressure in an encircling frame together with the other component parts of the radiator preparatory to soldering said parts together. To thwart this spreading there is provided a holding clip 71 the main body portion of which is angularly formed not only to fit the flutings 25 constituting the crimped edge portion 24 of the bottom of tank but to reinforcingly strengthen said clip as will be readily understood. The extreme end portions 72 of this clip are bent upwardly, over and securely clamped by pressure to the crimped edge 24 of the tank so that the clip is a part of the tank when inserted in the assembling frame along with the other component parts of the radiator. The clip 71 is of thin sheet material and therefore it occupies but little space between the top tank and the top series of hexagonal core formation. There is, however, sufficient strength in said clip due to the angularly formed main body portion thereof to serve the purpose for which it is intended namely, to prevent the spreading of the side walls 21 and 22 of the top tank when compression is applied to the aforesaid assembling frame.

It is to be noted that one end of the top tank has a lateral flange or extension 73 which is adapted to fit the hexagonal configuration of the top course of the radiator core, and to meet the edge of the upper wall of the side tank 7 as clearly shown in Figs. 9, 12 and 13. In other words, the top tank is extended by this flange to permit a more substantial joint being made between the top tank, the side tank 7, and the radiator core. From Fig. 9 it will be evident that this construction constitutes an improvement over heretofore known constructions in that the joint 74 between these three members is disposed a substantial distance from the vertical wall of the top tank, thus enabling the ready insertion and utilization of a soldering iron with which the joint may not only be formed but repaired if and when necessary.

Fig. 13 discloses a modified form of top tank which, besides the vertical strengthening indentions 70 above described, is further provided with horizontally disposed strengthening ribs 75 disposed in the side walls of the tank in close proximity to the lowermost crimped edge. These horizontal ribs 75 are pressed into the material of the side tank during its formation and are arcuate in cross section as clearly shown in Fig. 16. The horizontal rib in the wall in which is also formed the vertical ribs 70, may of necessity be divided to provide an end rib such as 76 at one end of the tank, a central rib 77 intermediate the two vertical ribs 70, and a third rib 78 disposed at the other end of the tank. The length of the vertical rib 70 will determine the necessity of providing a broken or unbroken rib running horizontally of the tank as will be readily understood. By providing the horizontally disposed ribs it has been discovered that the separating bar 23 as well as the holding clips 71 may be dispensed with, as sufficient stiffening is provided by said horizontal ribs to prevent the spreading of the side walls. 80 in Fig. 13 is a slit or opening made in the rear side wall of the upper tank into and through which the upper end of the vent pipe 14 is fitted and soldered, the material of said wall being flexed in opposite directions to either side of the slit 80, and curved to fit the configuration of said vent pipe.

Coming now to Fig. 17 there is disclosed in perspective view the side tank 6 located on the outlet side of the radiator. It is made from a sheet of relatively thin material pressed into shape to form the main outer wall 85 which is curved to also provide the bottom wall 86, and two opposed side walls 87 and 88 each provided with an outwardly extending flange 89 as will be clear from the drawings. Openings 90 and 91 in the side walls are provided for receiving the outlet fitting 8 shown in Fig. 1. The main outer wall 85 is provided with indentions such as 92 and 93 at the upper and lower portions thereof each of which constitutes a strengthening rib, said indentions extending lengthwise of the tank. The extreme upper portion of the tank 6 is pressed out of the plane of the main body portion thereof as indicated at 95 to fit the contour of the radiator core as will be clear from Figs. 1 and 17 and the extreme upper end of this obliquely formed end 95 is shouldered as at 96 to receive in overlapping engagement one end of the top tank 5 in a manner presently to be described. To prevent the spreading of the side walls 87 and 88 under pressure received from the assembling frame, the tank 6 is provided with a plurality of spaced holding clips 100 each provided with a strengthening rib 101, the ends of each clip being turned over and around the flanges 89 of said tank. In order to insure a more perfect and planer fit of the tank 6 with respect to the radiator core, the ends of the clips 100 where they contact with said flanges are "let-in" or sunk in said flanges as is clearly shown in Fig. 20. The bottom of the tank 6 is formed with a depending flange 102 which is pressed out of the plane of the side flanges 89 to provide a recessed portion 103, see Fig. 28 into which may extend the folded over or otherwise enlarged portion of the radiator core at the bottom of the radiator.

In Fig. 18 is shown a modified form of the outlet side tank 6 in which the same numerals have been used to designate parts similar to the parts shown in Fig. 17. The chief difference between these two tanks lies in the omission of the holding clips 100 and the substitution therefore of transversely formed indented strengthening ribs at spaced intervals. In other words, it has been found that the indented strengthening ribs 110 shown in Fig. 18 stiffen the walls of the tank sufficiently to withstand the pressure placed upon the side tank by the assembling frame when the component parts of the radiator are assembled preparatory to being soldered together.

Coming now to Figs. 21 and 22 there is disclosed the joint formed between the top tank 5 and the outlet side tank 6. From these figures it will readily be seen that the formation of the shoulder 96 at the top of the side tank provides an upwardly extending flange portion 112 of a dimension and adapted to fit within the side walls of the top tank 5 at one end thereof, the extreme edge portion of the top tank coming to rest on the shoulder 96. By this construction there is provided a limiting stop of compressional movement between the top and side tanks and there is also provided a substantial surface contact between the ends of these two tanks for receiving the solder with which the tanks are usually secured together.

In Figs. 23 and 24 there are disclosed suspensions for the complete radiator which differ from the suspension disclosed in Fig. 1. That is to say, in the last mentioned figure the radiator is suspended from the ornamental shell which in turn is supported by the front cross piece of the chassis of the automobile. In Fig. 23 the radiator proper is suspended in a substantially U-shaped sling which in turn is supported by the side chassis members. That is to say, there is provided a relatively strong strap of steel shaped to form a straight side portion 120 extending from near the top of the side tank 6 down to the bottom thereof where it is outwardly and reversely bent to provide a closed fold 121. The strap is then continued, passing underneath the radiator as indicated at 122 to the other side thereof where it is similarly formed to provide another closed fold and straight side portion, completing the U-shape. The radiator is secured, through the intervention of the spacing member 42 and the bolts 53 above described, to the vertical member 120 of this U-sling which in turn is supportingly secured in spaced relation to the side channel members 123 of the chassis as by a bolt 124 passing through each fold 121 of said sling. In other words, by this construction the radiator is springingly supported by the chassis through the flexing of the fold 121 in relation to the vertically and horizontally extending members of the U-sling. The ornamental shell 34 is secured on the outer side of the vertical member 120 of the U-sling as by the same bolts 53 which secure the radiator thereto, or by other bolts as desired.

The support shown in Fig. 24 is somewhat similar but differs from the foregoing in that the ornamental sheet 35 is mounted on a short bracket 130 having an outwardly extending flange 131 for receiving the bolt 124 with which the device is secured to the side channel member 123 of the chassis. The same fastening means for securing this bracket to the shell, such as the rivets 132, may also secure to said shell a short U-bar 133 reaching from side to side of the shell and beneath the radiator. The shell 35 is secured by the bolts 53 to the spacing member 42 in turn carried by the side tank 6 exactly as was the case in the construction shown in Fig. 1.

In Figs. 26, 27 and 28 is shown the joint between the bottom of the side tank 6 and the lowermost portion of the radiator core 1. The radiator core is made by the assembly of a plurality of strips of very thin sheet metal which are so crimped, indented and folded that, when they are assembled with intervening spacer strips, there are produced a plurality of horizontal passages 3 extending from the side tank 6 to the tank on the opposite side of the radiator. In Fig. 27 there are shown some of the identions, indicated at 140, the ridges 141 which are press rolled into the said thin strip metal, which coact with corresponding indentions and ridges so that, when solder is applied to the crimped edge portions of the strips, there will be provided a space for the liquid to travel from one side of the radiator to the other by virtue of the depressions or identions 140. In forming this core, which is not the subject matter of this invention, these preformed strips are doubled back upon themselves in spaced relation so that there is caused a fold at the side of the completed core which includes a vertically disposed portion indicated by the dotted line 142 joining the parallelly disposed portions of the strips. As before stated, these strips are preformed with ridges and indentions and therefore when such a fold is made it will be evident that the indented portion of a strip will extend out of the plane of the side strip extremity of the core 1. Such is the fact and an attempt has been made to show this as at 142. It is this extending and indented portion of the strip, forming part of the fold, which necessitates the recess 103 in the bottom flange 102 of the side tank 6 so that the side tank and core can be properly soldered with a tightly fitting joint.

Under some conditions it may be found advisable to provide a pipe 150 of small indentions connecting the top of the inlet tank 7 with one end of the top tank 5 as shown in Figure 4a to stabilize or equalize the pressure on both the hot and cold sides of the radiator core 1 when the engine is stopped suddenly under heavy load to prevent undue loss of water from the system due to what is known as water shift or displacement through the overflow pipe.

From the foregoing it will thus be seen that by this construction there is provided a radiator comprising a central core formed of a plurality of horizontally extending tubes having in thermal association therewith means to disseminate heat, said core extending to the bottom of the radiator. In combination with this core there is a tank disposed along one vertical side and in open communication with said tubes, said tank having an outlet in the side thereof through which the cooling fluid may enter, and said inlet having associated therewith means comprising the cock 12 for limiting the level of the liquid in the radiator. There is also provided a second tank disposed along the opposite vertical side of the core likewise in open communication with said tubes and provided with an outlet in its side through which the cooling fluid may be returned to the engine. Above the core and extending along the top side thereof and overlying at one end to be in open communication with the last mentioned tank, there is a third tank which, however, does not communicate with the first mentioned tank through which the cooling fluid enters the radiator. Lastly there is provided a U-shaped sling for indirectly supporting the radiator on the automobile through the instrumentality of an encompassing member, such as the ornamental shell for the radiator, in turn secured to the side tanks by yieldable extensions of said sling. The radiator is thus seen to be supported only from the side tanks by the frame of the automobile.

It is to be particularly noted that the tank 7 by having its inlet 9 at a point substantially halfway down thereof, is provided with an entirely closed upper end so that the liquid and vapors entering said tank will create pressure in the upper portion thereof which, in combination with the means such as the pump employed for circulating the cooling fluid, will compel said liquid and vapors to pass through the tubes 3 before they may leave the radiator. The liquid of course will leave the radiator through the outlet 8 in the other side tank 6, and the vapors will either be condensed in the tubes 3, whereupon the condensate will join the other liquid of the circuit, or else said vapors will be partially condensed in said tubes and in the top tank 5, or else some of the vapors will be condensed in the tubes and top tank and the remaining uncondensed vapors will, under extreme conditions, be lost from the system through the vent 14 to the atmosphere. It should further be observed that the inlet tank 7 is disposed to one side of the top tank 5 and independently closed with respect thereto. In other words, there is no direct communication between the tanks 5 and 7, whereby the vapors will be compelled to pass through the tubes 3 and the upper portion of the other side tank 6 to reach the top tank 5, the tanks 5 and 6 being in direct open communication. The tanks 5 and 7 are so constructed that there is created a common joint between the same and the core 1 which is spaced from a wall of the top tank and substantially in the plane of the top of the side tank 7, which permits of the free and ready application of a soldering iron to secure said joint.

Another important feature of this invention is the relatively large joint made possible between the top tank 5 and the upper surface of the core 1. In other words, the edge portions of the upper surface of said core is provided with serrations and the lower edge portion of the tank 5 is crimped to fit said serrations so that when the tank and the core are assembled and soldered, there will be a thin strong soldered joint of appreciable extent between the top tank and the core. Such a joint may have an added strength of as much as 50% with respect to a joint between the core and a straight bottom edge portion of the upper tank, according to the pitch or angularity of the serrations of said core.

Lastly, it is to be observed that all of the tanks are made from very thin flat sheet metal by a stamping process whereby each tank has one open side with edge portions adapted through said stamping operation to fit the contour of the heat disseminating core of the radiator to which the tank is to be attached. Each tank is further provided with reinforcements either comprising the holding clips or with impressions or indentions constituting ribs in a wall of the tank. By so constructing the tanks, there is avoided the usual soldering joints between adjacent meeting walls which may not be properly soldered or which may become unsoldered at points under pressure of the cooling fluid used in the cooling system of the automobile. Stated in still other words, it is a common experience to have leaks occur in the radiator tanks due to the fact that under extreme operating conditions such a pressure has been generated in the tanks as to cause the solder at a joint to give away and thus provide an exit for the cooling fluid which in time will bleed the system of said fluid and maybe cause serious damage to the motor.

It is obvious that those skilled in the art may vary the details of construction as well as arrangements of parts without departing from the spirit of the invention, and it is therefore not desired to be limited to the above disclosure except as is required by the claims.

What is claimed is:—

1. A suspension for a vehicle radiator including two side tanks and a core therebetween, the same comprising an encompassing member spaced from said core and tanks but secured to a supporting vehicle member, and plates obliquely disposed between each tank and said first named member for yieldably supporting the radiator therefrom.

2. A suspension for a vehicle radiator including two side tanks and a core therebetween, the same comprising an encompassing member spaced from said core and tanks but secured to a supporting vehicle member, and a plate in contact with and rigidly secured to each tank and provided with separated edge extensions, said extensions in substantially planar prolongation of the plate and disposed obliquely between each tank and said first named member for yieldably supporting the radiator therefrom.

3. A support for the radiator of a vehicle the same including a vehicle frame member, a shell secured to said member and encompassing said radiator, and wedge-like means obliquely secured to said shell for supporting said radiator in spaced relation to said vehicle frame.

4. A suspension for a vehicle radiator the same including a shell encompassing a plurality of sides of said radiator, means for attaching said shell to the vehicle, and substantially planar means for supporting said radiator in said shell, said means obliquely disposed to the encompassing portions of said shell.

5. A suspension for a vehicle radiator the same including a shell encompassing a plurality of sides of said radiator in spaced relation and having flanges adapted to engage the front of said radiator, means for attaching said shell to the vehicle, and wedge-like means creating said engagement while supporting said radiator in said shell, said means obliquely disposed to the encompassing portions of said shell.

6. A suspension for a vehicle radiator the same including a shell encompassing a plurality of sides of said radiator in spaced relation, means for attaching said shell to the vehicle, and substantially planar means disposed obliquely between said radiator and the encompassing shell portions to support said radiator in said shell while increasing the tension therebetween.

7. A suspension for a vehicle radiator including two vertical tanks and a heat dissipating core therebetween, the same including a U-shaped sling directly attached to said tanks and provided with extending ears disposed in the planes of the sides of said U, and a member encompassing said radiator and unsecured thereto for supporting said sling through said ears.

In testimony whereof I affix my signature.

WELLINGTON W. MUIR.